United States Patent

Marchal

[11] Patent Number: 5,386,965
[45] Date of Patent: Feb. 7, 1995

[54] HIGH PRESSURE FLOW VALVE WITH PRESSURE ASSIST VALVE SEAL

[75] Inventor: Francis V. Marchal, Erie, Pa.

[73] Assignee: Ber-Lo Manufacturing Company, Inc., Erie, Pa.

[21] Appl. No.: 70,905

[22] Filed: Jun. 4, 1993

[51] Int. Cl.6 ............................................. F16K 39/02
[52] U.S. Cl. ..................................... 251/282; 251/358
[58] Field of Search ................. 251/282, 356, 357, 358

[56] References Cited

U.S. PATENT DOCUMENTS

| | | | |
|---|---|---|---|
| 531,682 | 1/1895 | Hunter | 251/282 |
| 1,125,596 | 1/1915 | Robertshaw | 251/282 |
| 2,194,961 | 3/1940 | Walker | 251/357 X |
| 2,630,292 | 3/1953 | Skweir | 251/282 |
| 2,893,687 | 7/1959 | Huthsing, Sr. | 251/357 |
| 2,897,836 | 8/1959 | Peters et al. | 251/282 X |
| 3,010,695 | 11/1961 | Banks | 251/282 X |
| 3,137,476 | 6/1964 | Rotheraine et al. | 251/357 |
| 3,181,560 | 5/1965 | Worden et al. | 137/494 |
| 3,926,208 | 12/1975 | Hoffman et al. | 137/505 |
| 4,074,700 | 2/1978 | Engle | 251/282 X |
| 4,311,297 | 1/1982 | Barrington | 251/63.6 |
| 4,341,370 | 7/1982 | Banks | 251/282 |
| 4,500,069 | 2/1985 | Barber et al. | 251/282 |
| 4,553,735 | 11/1985 | Brundage | 251/129.16 |
| 4,766,932 | 8/1988 | Heymann et al. | 137/625.3 |
| 4,832,312 | 5/1989 | Linder et al. | 251/129.07 |
| 4,850,394 | 7/1989 | Imhof et al. | 251/282 X |
| 4,928,920 | 5/1990 | Feild | 251/118 |
| 5,010,923 | 4/1991 | Louda et al. | 137/625.34 |
| 5,046,530 | 9/1991 | Gossner et al. | 137/596.17 |
| 5,072,749 | 12/1991 | Ligh | 137/116.5 |
| 5,099,082 | 3/1992 | Smith, III | 137/614.04 |
| 5,133,386 | 7/1992 | Magee | 137/625.65 |
| 5,172,886 | 12/1992 | Takotani et al. | 251/205 |

Primary Examiner—John Rivell
Attorney, Agent, or Firm—Lovercheck and Lovercheck

[57] ABSTRACT

A high pressure valve having a gland with a pressure assist chamber therein, a body with an inlet and an outlet and a seat between the inlet and outlet. A piston in the pressure assist chamber. The stem having a lateral tip having a soft stem tip is concentrically bored to connect fluid pressure from the inlet to the top of the piston urging the piston to move the stem and the soft valve tip member toward the valve seat.

22 Claims, 5 Drawing Sheets

HIGH PRESSURE FLOW VALVE WITH PRESSURE ASSIST VALVE SEAL

BACKGROUND OF THE INVENTION

The present invention relates generally to high pressure flow valves and, more particularly to flow control valves for use in fluid systems, both gas and liquid, to channel fluids at desired flow rates and pressures. Ideally, a control valve opens when compelled to do so, by means of an external force, such as an air hydraulic operator or a threaded stem to raise or lower the stem or to close or open the valve. This ideal valve permits passage of a particular volume of fluid necessary to maintain the predetermined flow system parameters and then close tightly, and instantly, with zero leakage at a pre-set command. Unfortunately, in actual practice, this ideal is not always realized.

Commonly used control valves have a cracking or threshold pressure level, the pressure at which the valve begins to open, and a full flow pressure level, the pressure required to open them fully. The difference between full-flow pressure and cracking pressure levels is the pressure differential of the valve, commonly referred to as the valve override. The smaller the pressure differential, or override, the greater the sensitivity of the valve.

Prior control valves generally exhibit excessive differential which causes them to open at the cracking threshold at a pressure level far below the pre-set maximum system pressure level, which, greatly diminishes the useful flow in the fluid system.

Prior valves are also prone to excessive chattering which is generally caused by an instability of the internal fluid sealing elements. In addition, these prior devices also exhibit an objectionable characteristic referred to as "dead band" where the valve closes at a pressure value which is different than the pressure at which the valve opens.

Ideally, a control valve of this type should exhibit a zero dead band characteristic and, thus, open and close at substantially the same fluid pressure. In addition, many prior valves also develop leakage problems, particularly, in high pressure systems. For example, at 20,000 PSI and above.

Applicant is aware of the following U.S. Patents:

| | |
|---|---|
| 3,181,560 to Worden et al. | 4,928,920 to Feild |
| 3,926,208 to Hoffman et al. | 5,010,923 to Kouda et al. |
| 4,311,297 to Barrington | 5,046,530 to Gossner et al. |
| 4,500,069 to Barber et al. | 5,072,749 to Ligh |
| 4,553,735 to Brundage | 5,099,882 to Smith, III |
| 4,766,932 to Heymann et al. | 5,133,386 to Magee |
| 4,832,312 to Linder et al. | 5,172,886 to Takotani et al |

SUMMARY OF THE INVENTION

The present invention solves the prior problem by providing a full flow valve suitable for very high system fluid pressures, for example, 20,000 PSI and above. The present invention provides a pressure control valve in which the valve differential override is minimized so as to yield a valve with improved performance and sensitivity at these high fluid pressures. In addition, the dead band characteristic is substantially eliminated in the present valve.

The present invention further provides a pressure control valve which eliminates the prior problem of stem chattering by way of an improved plunger stem and stem tip seal characteristic. Further, the control valve of the present invention provides improved life in hostile environments, to virtually eliminate leakage problems due to corrosion or erosion. Should maintenance be required, the pressure control valve of this invention provides a valve of such geometry which may conveniently be refurbished at minimal cost by merely replacing the worn components. In addition, the invention provides a replaceable stem tip sealing arrangement in which fluid leakage is eliminated at the aforementioned high pressure (Teflon is preferred).

The valve is a "soft tip" plug type needle valve, intended for fluid systems of 20,000 PSI and above. To minimize the external force required to seal the fluid at the valve body seat, a unique pressure assisted principal is used to arrive at low external force to affect a seal at the valve's seat. This is accomplished by varying the areas of the stem, thus pre-determining at will the external force required to make a seal.

It will be noted that applicant has disclosed a high pressure control valve with a "zero leakage" polyamide stem tip capable of sealing high pressure fluids with low external forces. The polyamide seal is reinforced to resist "hoop stress" with a "pressed on" circumferential girth band. This band also prevents extrusion of the polyamide material. The center of the seal is "port drilled" to communicate to the pressure assist chamber. The seal is tapered to fit a matching taper on the stem, an interference fit occurs between stem tip, making it virtually impossible to remove, except by external deliberate means.

The stem is massively designed to resist buckling. A pressure communicating port to the pressure assist chamber is drilled on center line. A piston seal groove is machined at the largest diameter of the stem to seal the pressure assist chamber and affect a downward force and motion of the stem to affect a seal at the valve seat. The system is designed with a "blow out" proof feature (stem is retained in the gland, thus preventing the stem from traveling as a projectile body, not launch). In the manual control valve thread load is minimized to seat loading only, and not retaining system pressure load.

The high pressure control valve may be designed to open at a predetermined fluid system pressure. The valve body has a central bore axially extending therethrough having an inlet to communicate with the high pressure fluid, and at least one outlet orifice formed transversely through the valve body. The gland member has an internal bore for slidably accepting a valve stem. The valve stem has a non rotating soft-seat plug. In one of the manually operated versions of the valve, a threaded stem is provided, which is serviceable while the valve is on pressure. Another manually operated valve has a spring to close it and manual squeeze force to open. The valve may readily be convertible to spring to close and air to open. The valve is readily convertible to normally-open air-to-close. The valve may be readily convertible to a direct command, remote operation open or close. The valve with a replaceable stem tip is capable of convenient interchangability for changing the flow characteristics of the valve. The valve stem is supported in the cylindrical rod bore at the bottom of the retaining bore and the stem is therefore a floating stem so attached to the device actuator that non-binding movement is permitted during linear motion of the stem. It is very desirable to have the stem find its center on the valve seat.

It is an object of the present invention to provide a valve that will function as a manual valve with a threaded stem having a very low hand tightening torque.

It is another object of the present invention to provide a valve that may also be readily converted to a direct acting, remote control valve when fitted with one of several spring, air or hydraulic actuated motion devices. The system can be operated remotely and automatically.

It is another object of the present invention to provide a valve that is a normally closed, air-to-open, may be "spring set" and be used as a direct acting relief valve.

It is another object of the present invention to provide a valve that is normally open, air-to-close, may be "pre-set" in conjunction with a solenoid valve and used as a positive shutoff valve, which opens on power failure absence of air flow to the valve operator.

It is another object of the present invention to provide a valve that may also be operated with a direct acting operator, either air or hydraulic, to open or close the valve on command.

It is another object of the present invention to provide a manual valve that may be used as a high pressure flow valve for refueling domestic automotive type vehicles, with high pressure fuel gas or liquid. This version will be spring-to-close and manual pull force to open.

It is another object of the present invention to provide a pressure assist valve seal that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
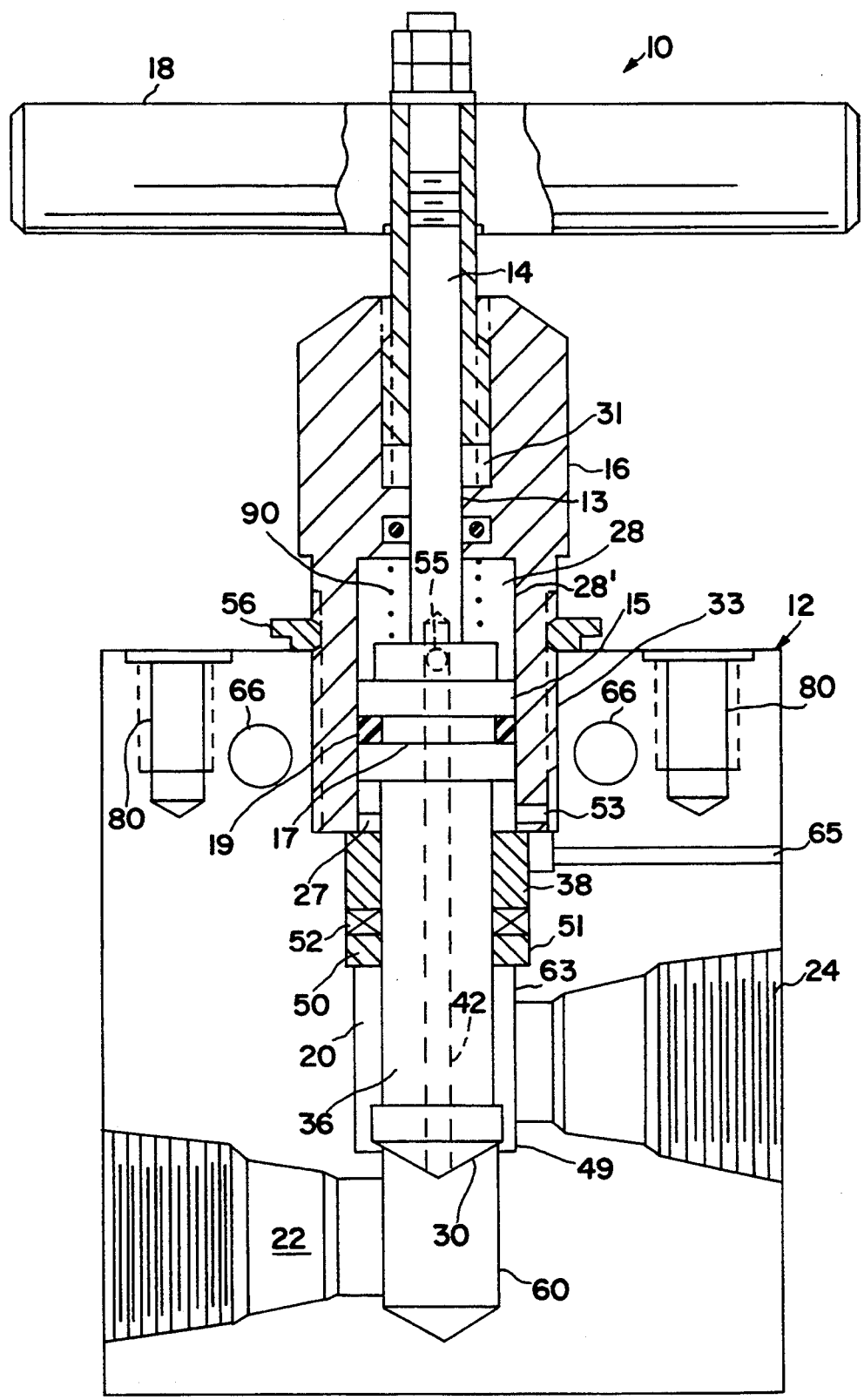
FIG. 1 is a longitudinal cross sectional view of a manually operated valve according to the invention.
Figure 2:
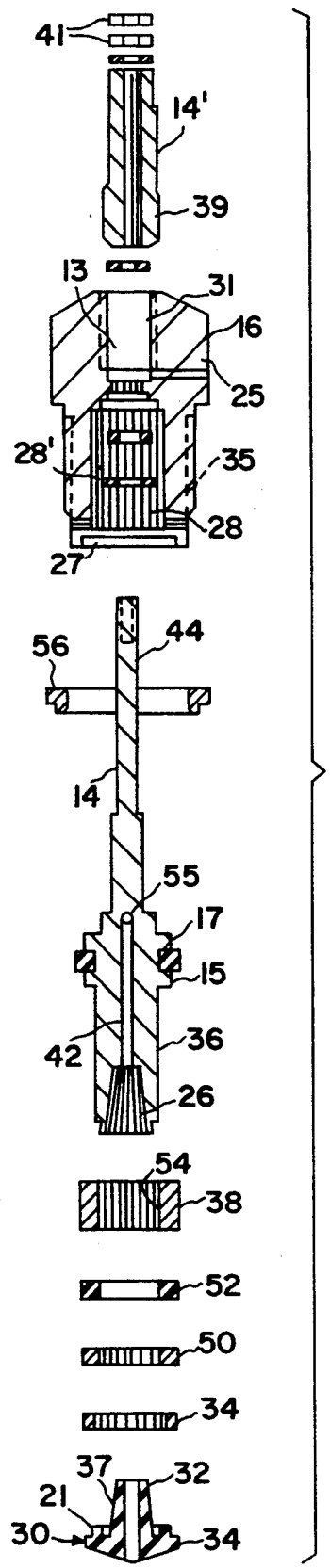
FIG. 2 is an exploded view of the valve shown in FIG. 1.

Now with more particular reference to the drawings, FIGS. 1 and 2 show high pressure control valve 10. Valve 10 has body 12, stem 14 and gland 16. Valve body 12 may be attached to a support structure by studs engaging in mounting holes 66.

Stem 14 has piston 15 integrally attached thereto which has sealing ring groove 17 and sealing ring 19. Piston 15 is slidably received in pressure assist chamber 28. Stem 14 has enlarged lower part 36 which is integrally attached to piston 15 and is considerably more massive than threaded upper end 44 of stem 14. Lower part 36 of stem 14 is slidably received in bushing 38.

Pressure assist chamber 28 is formed by counterbore 28' in gland 16. Piston 15 is received in counterbore 28'.

Gland 16 has threaded lower end 35 which is threaded into counterbore 33 of body 12 and locked in place by lock nut 56. Lower end 35 of gland 16 has counterbore 27 which receives upper end 45 of bushing 38.

The upper end of gland 16 has bore 13. Stem 14 extends through bore 13.

Handle 18 is fixed to stem 14 and acts as an operating means for valve 10.

Tapered axial bore 26 of lower part 36 of stem 14 receives tapered shank 32 of stem tip 30 with an interference fit therebetween.

Stem tip 30 is made of material having the properties of polyamide. Stem tip 30 has conical part 40 and cylindrical intermediate part 29. Intermediate part 29 has upwardly facing groove 37, tapered shank 32 and bore 46. Groove 37 is formed in intermediate part 29 forming flange 21. Annular flat ends 59 of stem 14 rest on the flat bottom of groove 37. Stem tip 30 is pressed into stainless steel hoop ring 34. Thus, when stem tip 30 is resting on valve seat 49 and a high pressure fluid is introduced into inlet 22, an upward force is exerted on stem tip 30. A pressure of fluid from inlet 22 will be exerted on the upper side of piston 15, opposing the force on stem tip 30, making it easy to move stem tip 30 from an open to a closed position and back.

Threaded counterbore 31, of bore 13 of the upper end of gland 16, receives threaded lower end 39 of stem sleeve 14'. Nuts 41 are received on upper end 44 of stem 14.

Bushing 38 rests on stem packing 52 which in turn, rests on bottom washer 50. Vent hole 53 is bored in a side of gland 16 adjacent lower end 35 of gland 16 to bleed air from the space below piston 15 through vent hole 65 in body 12. Stem 14 extends through bore 54 in bushing 38 and through stem packing 52 and through bottom washer 50.

Communication port 42, of stem 14, extends from stem tip 30 to lateral bore 55 in stem 14 and connects inlet 22 to pressure assist chamber 28. Fluid in communication port 42 equalizes the pressure of pressure asset chamber 28 with the fluid pressure in inlet 22.

The pressure from inlet chamber 22 exerts an upward pressure on the entire area of the part of the lower end of stem tip 30, less the area of communication port 42. Communication port 42 is connected to pressure assist chamber 28. Pressure in pressure assist chamber 28 exerts a downward force on piston 15 opposing the upward force on stem tip 30. Since the area of piston 15 exposed to pressure in pressure assist chamber 28 is greater than the net area of stem tip 30 exposed to inlet pressure, a downward force is exerted on stem 36 which exerts a force on stem tip 30 tending to close the valve.

Central bore 60 in body 12 extends between inlet 22 and outlet 24 of body 12. Central bore 60 has first counterbore 20 having a side wall. The side wall terminates at valve seat 49 for stem tip 30. Second counterbore 51 in body 12 receives bushing 38, bottom washer 50 and stem packing 52.

Figure 3:
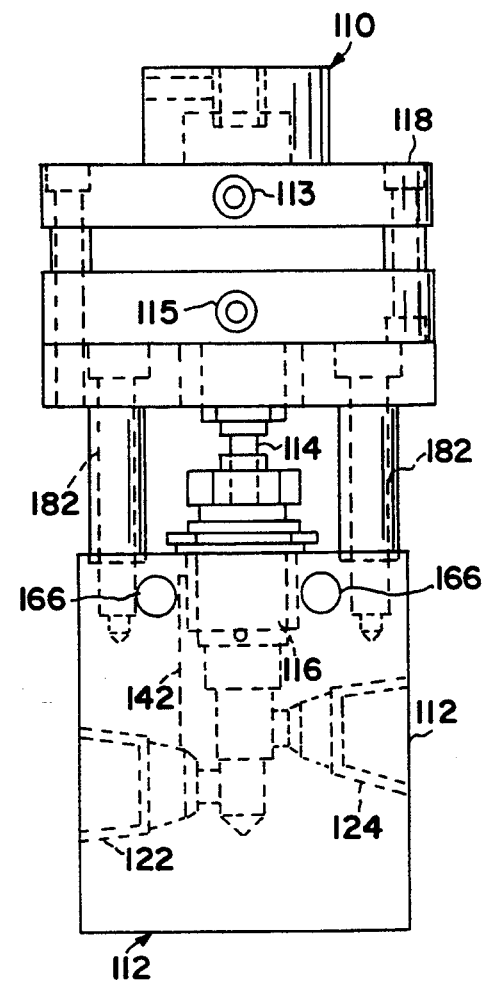
FIG. 3 is a front view of an air or hydraulic actuated control valve.

Holes 80 support a power operator such as operator 118 as shown in FIG. 3.

Spring 90 rests on lower part 36 of stem 14 and against gland 16 urging stem 14 downward toward valve seat 49.

The embodiments of the invention shown in FIGS. 3 through 7, each show a valve mechanism similar to the valve mechanism shown in FIG. 1, but instead of a manual handle, a power actuating apparatus is attached to the valve stem.

In the embodiment of the invention shown in FIG. 3, valve 110 has body 112 with inlet 122 and outlet 124. Motor actuator 118 is supported on body 112 by studs 182. Valve 110 has gland 116 and valve stem 114. Mounting holes 166 are provided for support means to support body 112 on a support structure. Openings 113,114 are for actuating fluid connectors.

Figure 4:
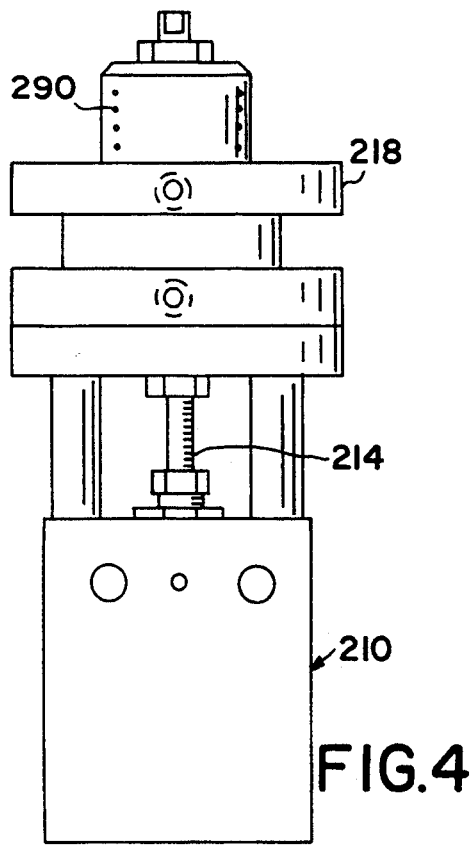
FIG. 4 is a front view of a normally closed hydraulic or air operated valve according to the invention.

In the embodiment shown in FIG. 4, valve 210 may be operated by air hydraulic double acting cylinder 218 attached to stem 214. Compression spring 290 urges stem 214 toward a closed position, forming a normally closed valve.

Figure 5:
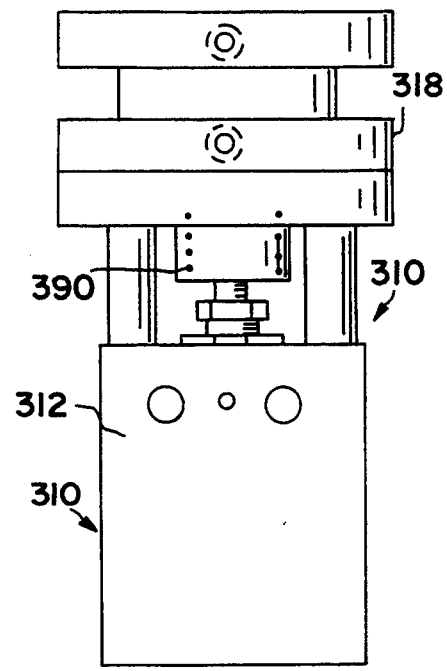
FIG. 5 is a front view of a normally open hydraulic or air operated valve like the valve shown in FIG. 4.

In the embodiment of the invention shown in FIG. 5, valve 310 has body 312 and double acting air or hydraulic cylinder 318. Compression spring 390 urges stem 314 toward an open position, forming a normally open valve.

Figure 6:
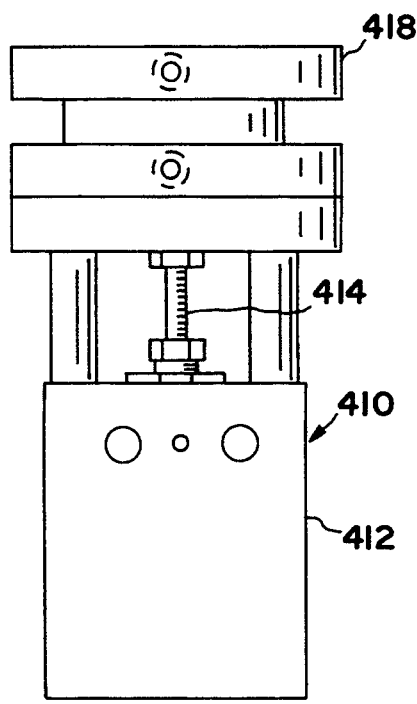
FIG. 6 is a front view of a double acting hydraulic or air to open and close valve according to the invention.

The embodiment of the invention of FIG. 6 shows valve 410 with body 412. Double acting air or hydraulic cylinder 418 is connected to valve stem 414, forming a double acting valve.

Figure 7:
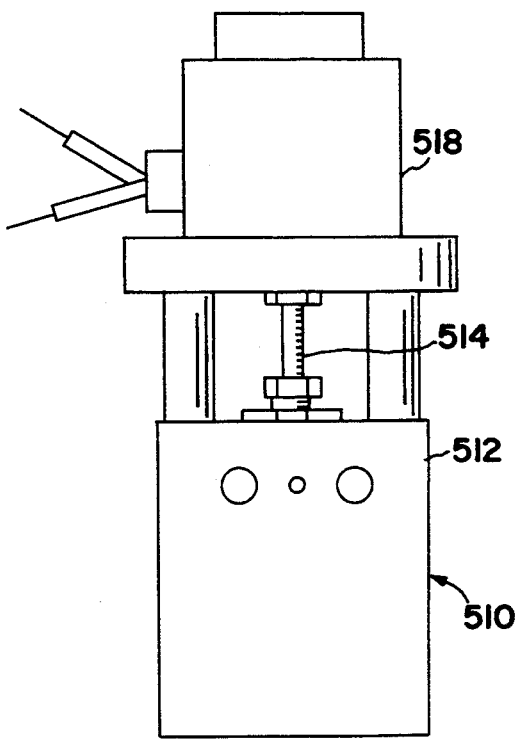
FIG. 7 is a front view of a direct acting electric power solenoid valve according to the invention.

The embodiment of the invention in FIG. 7 shows valve 510 having body 512. Solenoid actuator 518 is attached to valve stem 514 and may be a single or double acting solenoid.

Figure 8:
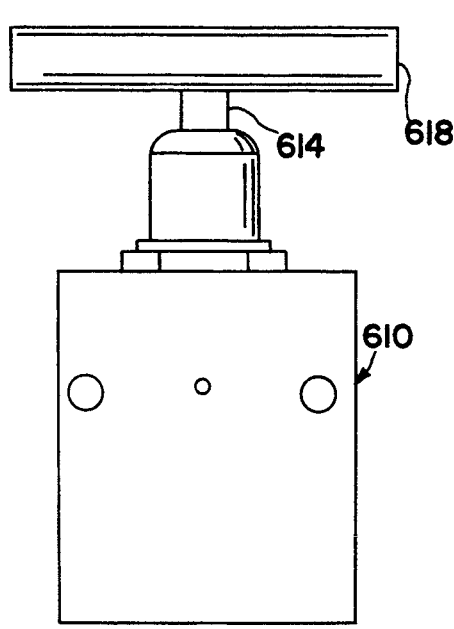
FIG. 8 is a front view of a manually controlled valve according to the invention.

In the embodiment of the invention in FIG. 8 valve 610 has threaded stem 614. Manually rotating handle 618 operates stem 614 moving the stem 614 in and out of body 612.

Figure 9:
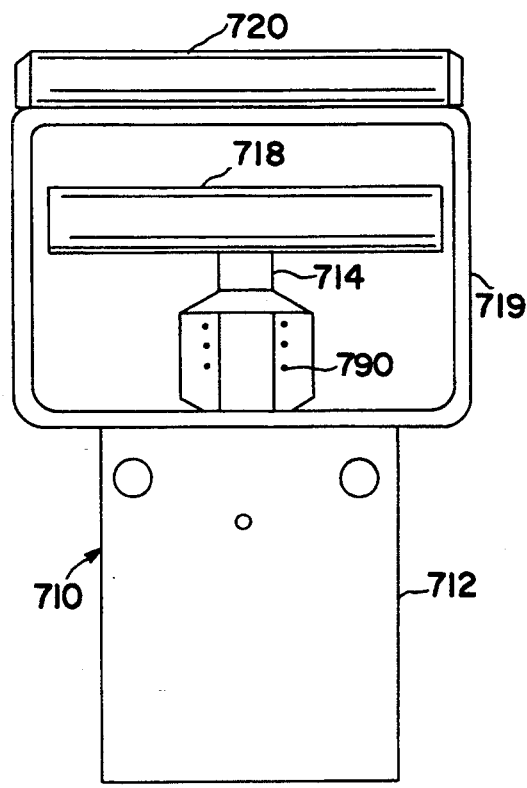
FIG. 9 is a front view of a lift to open normally closed valve according to the invention.
Figure 10:
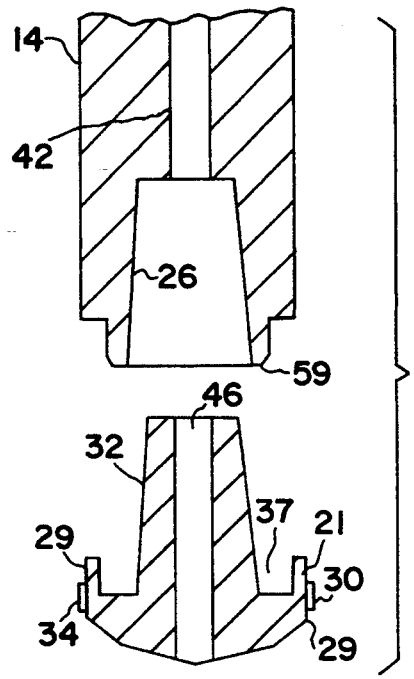
FIG. 10 is an enlarged exploded partial view of a part of the stem and the stem tip according to the invention.
Figure 11:
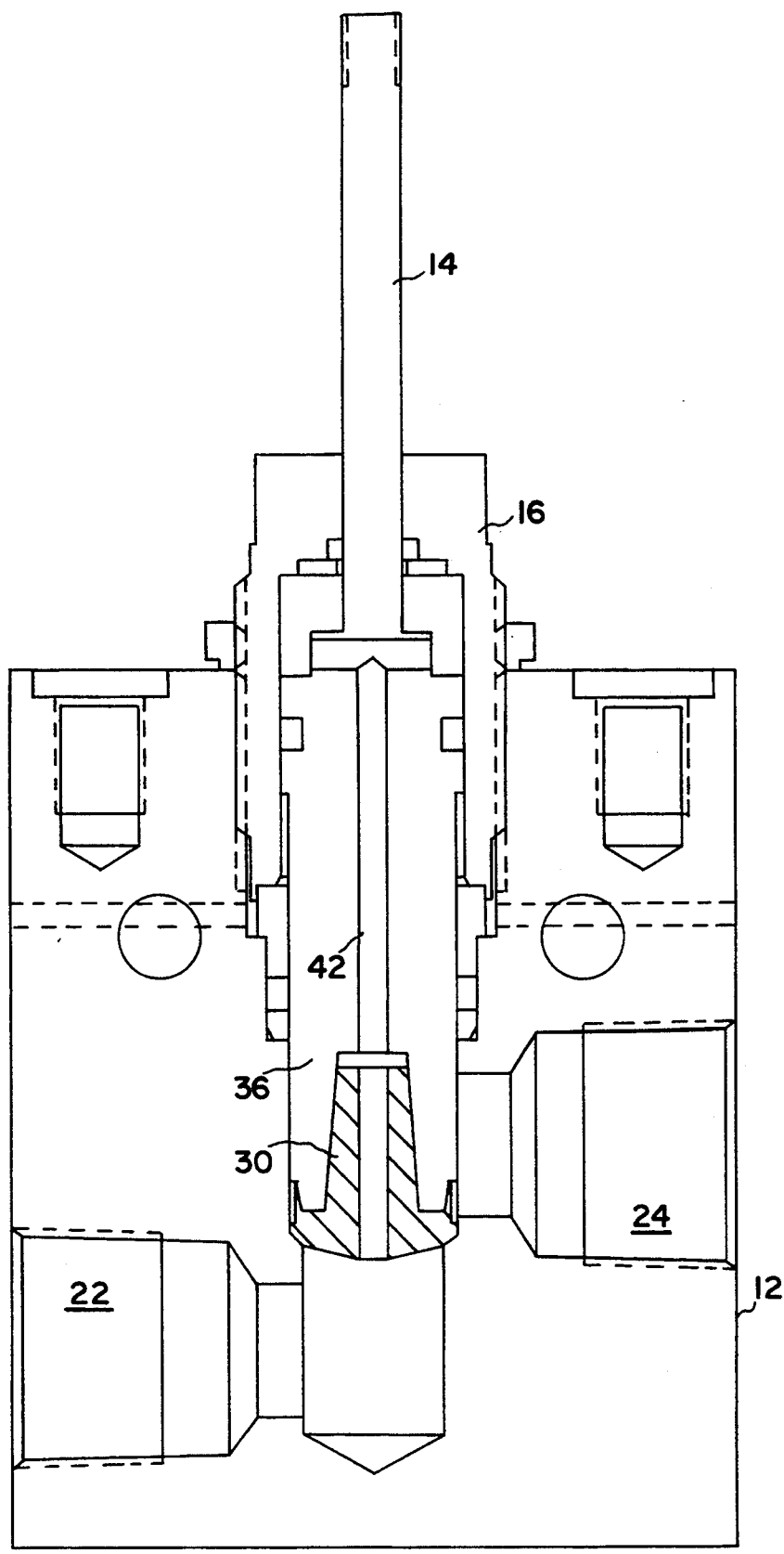
FIG. 11 is a schematic view of the valve shown in FIG. 1.

The embodiment of the invention of FIG. 9 shows manual valve 710 with compression spring 790. Compression spring 790 urges stem 714 toward an open or closed position. Manual handle 718 is fixed to stem 714. Fixed handle 720 is fixed to valve body 712 by bracket 719. Fixed handle 720 supports the hand of an operator while the operator's fingers grasp handle 720 to lift handle 718 against the force of spring 790 to open the valve.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A high pressure control valve comprising a valve body, a stem, a piston on said stem, a gland and operating means attached to said stem;

said valve body having a central bore terminating therein, an inlet and an outlet;
said central bore having a counterbore,
said counterbore terminating in a valve seat;
said inlet being connected to said central bore;
said outlet being connected to said counterbore with said valve seat between said inlet and said outlet;
said central bore being disposed between said inlet and said outlet connecting said inlet to said outlet;
said gland being attached to said valve body;
said gland having a bore;
a pressure assist chamber in said gland communicating with said central bore;
said stem extending through said bore of said gland into said pressure assist chamber and to said inlet;
said stem having a stem tip made of a material having substantially the properties of resiliency of polyamide thereon adapted to engage said valve seat thereby stopping flow of fluid from said inlet to said outlet;
said piston being disposed in said pressure assist chamber and sealingly engaging said gland;
a part of said stem tip being adapted to be engaged by fluid in said inlet urging said stem away from said valve seat by a force of fluid under pressure; and,
a communication port in said stem connecting said inlet through said stem to said pressure assist chamber whereby said fluid from said inlet communicates with said pressure assist chamber and fluid pressure from said inlet exerts a pressure on said piston urging said stem tip toward said valve seat with a force approximately equal to said force urging said stem away from said valve seat; and,
a spring is connected to said stem urging said stem toward said valve seat whereby a resultant closing force is exerted on said stem.

2. The valve recited in claim 1 wherein said operating means comprises a fluid actuated piston and cylinder connected to said stem.

3. The valve recited in claim 1 wherein a relatively rigid hoop ring is disposed around said stem tip whereby distortion of material of said stem tip is resisted.

4. The valve recited in claim 1 wherein said stem tip has an end that is conical in shape.

5. The valve recited in claim 1 wherein said communication port is a central channel concentric to said stem and extends through said stem tip to said pressure assist chamber.

6. The valve recited in claim 1 wherein said piston is an integral part of said stem.

7. The valve recited in claim 1 wherein said pressure assist chamber has cylindrical walls;
a groove is formed in said piston and a sealing ring is disposed in said groove in sealing engagement with said cylindrical walls of said pressure assist chamber.

8. The valve recited in claim 1 wherein said piston has a peripheral groove and a sealing ring is disposed in said groove.

9. The valve recited in claim 1 wherein said stem extends through said bore in said gland;
said bore in said gland being smaller than said piston whereby said piston prevents said stem from being forced through said bore in said gland by liquid pressure from said inlet.

10. The valve recited in claim 1 wherein said pressure assist chamber comprises a counterbore in said gland with said piston received in said counterbore therein.

11. A high pressure control valve comprising a valve body, a stem, a piston on said stem, a gland and operating means attached to said stem;

said valve body having a central bore terminating therein, an inlet and an outlet;

said central bore having a counterbore, said counterbore terminating in a valve seat;

said inlet being connected to said central bore;

said outlet being connected to said counterbore with said valve seat between said inlet and said outlet;

said central bore being disposed between said inlet and said outlet connecting said inlet to said outlet;

said gland being attached to said valve body;

said gland having a bore;

a pressure assist chamber in said gland communicating with said central bore;

said stem extending through said bore of said gland into said pressure assist chamber and to said inlet;

said stem having a stem tip made of a material having substantially the properties of resiliency of polyamide thereon adapted to engage said valve seat thereby stopping flow of fluid from said inlet to said outlet;

said piston being disposed in said pressure assist chamber and sealingly engaging said gland;

a part of said stem tip being adapted to be engaged by fluid in said inlet urging said stem away from said valve seat by a force of fluid under pressure; and, a communication port in said stem connecting said inlet through said stem to said pressure assist chamber whereby said fluid from said inlet communicates with said pressure assist chamber and fluid pressure from said inlet exerts a pressure on said piston urging said stem tip toward said valve seat with a force greater than said force urging said stem away from said valve seat whereby a resultant closing force is exerted on said stem; and, said stem has an enlarged lower end part extending from stem tip to said piston;

a brushing is disposed in said body adjacent said gland;

said lower end part of said stem being slidably received in said bushing whereby buckling of said stem is resisted;

a vent hole in said bushing connected to a vent hole in said body to vent a space between said piston and said bushing; and, said bushing is disposed a substantial distance from said stem tip.

12. The valve recited in claim 12 wherein said operating means comprises a fluid actuated piston and cylinder connected to said stem.

13. A high pressure control valve comprising a valve body, a stem, a piston on said stem, a gland and operating means attached to said stem;

said valve body having a central bore terminating therein, an inlet and an outlet;

said central bore having a counterbore, said counterbore terminating in a valve seat;

said inlet being connected to said central bore;

said outlet being connected to said counterbore with said valve seat between said inlet and said outlet;

said central bore being disposed between said inlet and said outlet connecting said inlet to said outlet;

said gland being attached to said valve body;

said gland having a bore;

a pressure assist chamber in said gland communicating with said central bore;

said stem extending through said bore of said gland into said pressure assist chamber and to said inlet;

said stem having a stem tip made of a material having substantially the properties of resiliency of polyamide thereon adapted to engage said valve seat thereby stopping flow of fluid from said inlet to said outlet;

said piston being disposed in said pressure assist chamber and sealingly engaging said gland;

a part of said stem tip being adapted to be engaged by fluid in said inlet urging said stem away from said valve seat by a force of fluid under pressure; and, a communication port in said stem connecting said inlet through said stem to said pressure assist chamber whereby said fluid from said inlet communicates with said pressure assist chamber and fluid pressure from said inlet exerts a pressure on said piston urging said stem tip toward said valve seat with a force greater than said force urging said stem away from said valve seat whereby a resultant closing force is exerted on said stem; and, said stem has a lower end part and a tapered axial bore in said lower end;

said stem having a tapered shank;

said tapered shank being received in said tapered axial bore in said lower end part of said stem;

said tapered shank having an interference fit with said axial bore in said stem whereby said tip is positively held to said stem.

14. The valve recited in claim 14 wherein said operating means comprises a fluid actuated piston and cylinder connected to said stem.

15. A soft tip plug-type needle valve adapted to be used with high pressure comprising a body and a central bore in said body;

an inlet and an outlet;

a valve seat between said inlet and said outlet;

a valve stem slidably received in said central bore;

a piston integrally attached to said valve stem;

a pressure assist chamber means supported on said body;

said piston being slidably received in said pressure assist chamber means;

said stem having a central communication port means formed therein;

a tapered axial bore in a first end of said stem connected to said pressure assist chamber means;

said central communication port means being connected to said tapered bore;

a stem tip having a conical part and being made of a relatively soft material;

said stem tip having a tapered shank received in said tapered bore;

a bore in said stem tip extending through said tapered shank and through said conical part and communicating with said central bore whereby fluid under pressure in said inlet communicates with said pressure assist chamber means exerting a force on said piston thereby urging said conical part of said stem tip toward said valve seat.

16. The valve recited in claim 16 wherein said stem tip has a cylindrical intermediate part and a hoop extending around said cylindrical intermediate part.

17. The valve recited in claim 16 wherein said stem has an enlarged lower part extending from said piston to said stem tip and, said enlarged lower part being of a substantially greater diameter than said stem on the side of said piston remote from said enlarged lower part.

18. The valve recited in claim 16 wherein a compression spring is disposed in said pressure assist chamber means connected to said stem urging said stem toward said valve seat.

19. A high pressure valve comprising a body and a stem;

an inlet and an outlet in said body;
a central bore between said inlet and said outlet;
a valve seat in said central bore between said inlet and said outlet;
a pressure assist chamber in said valve body;
said stem extending through said central bore into said pressure assist chamber;
a stem tip made of a relatively soft material on said stem adapted to engage said valve seat;
a piston connected to said stem and disposed in said pressure assist chamber;
a communication port in said stem connecting said inlet to said pressure assist chamber whereby fluid from said inlet is connected to said pressure assist chamber urging said stem toward said valve seat;

said stem tip is made of a relatively soft flexible material and has a generally conical tip part adapted to engage said valve seat;
said stem tip having a generally cylindrical intermediate part joining said conical tip part;
a hoop ring having an inside surface generally shaped to engage said intermediate part to reinforce said stem tip and preventing said stem tip from extruding when said inlet contains high pressure liquid.

20. The valve recited in claim 18 wherein said stem tip has a tapered shank attached thereto; and, said tapered shank being recessed in a tapered bore in said stem.

21. The valve recited in claim 18 wherein an upwardly facing groove is formed in said stem tip and extending upwardly into said stem and forming a hoop with said stem;

said stem tip having a flange on its lower end extending into said groove and resting on the bottom of said groove.

22. The valve recited in claim 21 wherein an upwardly facing groove is formed in said stem tip and extending upwardly into said stem and forming a hoop with said stem;

said stem tip having a flange on its lower end extending into said groove and resting on the bottom of said groove.

* * * * *